(12) United States Patent
Lee et al.

(10) Patent No.: US 11,314,112 B2
(45) Date of Patent: Apr. 26, 2022

(54) DISPLAY APPARATUS

(71) Applicant: SAMSUNG ELECTRONICS CO., LTD., Suwon-si (KR)

(72) Inventors: Min Seok Lee, Suwon-si (KR); Joon Mok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/744,744

(22) Filed: Jan. 16, 2020

(65) Prior Publication Data

US 2020/0225528 A1 Jul. 16, 2020

(30) Foreign Application Priority Data

Jan. 16, 2019 (KR) .................. 10-2019-0005574

(51) Int. Cl.
*G02F 1/1333* (2006.01)
*G02F 1/13357* (2006.01)
*G02F 1/1362* (2006.01)
*G02F 1/1335* (2006.01)

(52) U.S. Cl.
CPC .. *G02F 1/133305* (2013.01); *G02F 1/133602* (2013.01); *G02F 1/136286* (2013.01); *G02F 1/133612* (2021.01)

(58) Field of Classification Search
CPC ......... G02F 1/133305; G02F 1/133602; G02F 1/136286; G02F 2001/133612; G02F 1/13452; G02F 2001/133334; G02F 1/133308
See application file for complete search history.

(56) References Cited

U.S. PATENT DOCUMENTS

| 5,331,513 | A | * | 7/1994 | Hirai | H01L 23/3164 |
| | | | | | 156/380.6 |
| 6,271,058 | B1 | * | 8/2001 | Yoshida | H01L 21/563 |
| | | | | | 257/718 |
| 6,713,844 | B2 | * | 3/2004 | Tatsuta | H01L 21/563 |
| | | | | | 174/535 |
| 9,209,107 | B2 | * | 12/2015 | Kuroda | H01L 23/3675 |
| 9,568,800 | B1 | * | 2/2017 | Sprague | G02F 1/133308 |
| 2006/0040520 | A1 | | 2/2006 | Moh | |
| 2008/0006824 | A1 | * | 1/2008 | Lee | H01J 5/54 |
| | | | | | 257/53 |
| 2009/0059119 | A1 | * | 3/2009 | Ohta | B65D 85/38 |
| | | | | | 349/62 |

(Continued)

OTHER PUBLICATIONS

European Search Report and Written Opinion dated Apr. 29, 2020, in corresponding European Patent Application No. 20151349.6 with Abstract.

*Primary Examiner* — Anthony M Haughton
*Assistant Examiner* — Theron S Milliser
(74) *Attorney, Agent, or Firm* — Nixon & Vanderhye P.C.

(57) ABSTRACT

Provided is a display apparatus. The display apparatus includes: a display panel; a chassis accommodating the display panel; a plurality of circuit boards accommodated in the chassis; a flexible cable electrically connected to each of the plurality of circuit boards; and a deformation member comprising a thermally reactive material positioned on a portion of the cable wherein, at least one portion of the cable is configured to contact the chassis to provide a return path based on heat being generated by the chassis to deform the deformation member.

19 Claims, 5 Drawing Sheets

(56) References Cited

U.S. PATENT DOCUMENTS

| | | | |
|---|---|---|---|
| 2009/0079896 A1* | 3/2009 | Hayashi | G02F 1/1303 |
| | | | 349/58 |
| 2011/0063854 A1* | 3/2011 | Johnston | G02B 5/0242 |
| | | | 362/311.03 |
| 2013/0057784 A1* | 3/2013 | Kuroda | G02F 1/133308 |
| | | | 348/836 |
| 2013/0141664 A1 | 6/2013 | Toyoyama | |
| 2014/0176840 A1 | 6/2014 | Hashido | |
| 2016/0187703 A1* | 6/2016 | Tang | G02F 1/13394 |
| | | | 349/58 |
| 2016/0249475 A1 | 8/2016 | Park | |

* cited by examiner

DISPLAY APPARATUS

CROSS-REFERENCE TO RELATED APPLICATION

This application is based on and claims priority under 35 U.S.C. § 119 to Korean Patent Application No. 10-2019-0005574, filed on Jan. 16, 2019, in the Korean Intellectual Property Office, the disclosure of which is incorporated by reference herein in its entirety.

BACKGROUND

1. Field

The disclosure relates to a display apparatus, and for example, to a display apparatus having a flexible cable.

2. Description of Related Art

A display apparatus may refer, for example, to an output apparatus that converts electrical information into visual information to display the visual information for users. The display apparatus may include a portable device, such as a notebook PC, a smart phone and a tablet PC, as well as a television and a monitor.

The display apparatus may include a self-emissive display panel such as an organic light-emitting diode (OLED) or a non-emissive display panel such as a liquid crystal display (LCD).

A display apparatus to which a non-emissive display panel is applied may include a backlight unit for providing light to the display panel. The backlight unit may include an edge-type backlight unit in which a light source is positioned in at least one side of the display panel and a direct-type backlight unit in which a light source is positioned behind the display panel.

The display apparatus may include various circuit boards for operating the display apparatus. The circuit boards may be connected to each other to transmit/receive data, signals and power to/from each other. The circuit boards may be connected to each other by an electric wire, a flexible flat cable (FFC), or a flexible printed circuit board (FPCB).

SUMMARY

Embodiments of the disclosure provide a display apparatus with an improved electro-magnetic interference (EMI) characteristic.

Additional aspects of the disclosure will be set forth in part in the description which follows and, in part, will be apparent from the description.

According to an example aspect of the disclosure, a display apparatus includes: a display panel; a chassis accommodating the display panel; a plurality of circuit boards accommodated in the chassis; a flexible cable electrically connected to the plurality of circuit boards; and a deformation member comprising a thermally reactive material positioned on a portion of the cable, wherein at least one portion of the cable is configured to contact the chassis to form a return path based on heat generated by the chassis deforming the deformation member.

When the deformation member is shrunk, at least one portion of the cable may contact the chassis.

The deformation member may be shrinkable by heat generated when the display apparatus is driven.

The deformation member may be positioned on a surface of the cable, opposite to one surface of the cable facing the chassis.

The deformation member may be positioned on a center portion of the cable.

The cable may include a deformation portion, and the deformation member may include a first fixing portion fixed to one end of the deformation portion and a second fixing portion fixed to another end of the deformation portion.

When the deformation member is shrunk such that the first fixing portion becomes closer to the second fixing portion, at least one part of the deformation portion may be spaced from the deformation member to be bent toward the chassis.

The first fixing portion may be spaced from the second fixing portion along a longitudinal direction of the cable.

The plurality of circuit boards may include at least one of a main board, a backlight unit (BLU) driver, a switched mode power supply (SMPS) board or a source board.

When the deformation member is shrunk, the cable may be deformed in a direction of shortening a return path formed between the cable and the chassis.

The deformation member may be positioned on a surface of the cable, the surface being opposite to one surface of the cable forming the return path based on the cable transmitting a signal.

The cable may include at least one of a flexible flat cable (FFC) or a flexible printed circuit board (FPCB).

The deformation member may include a heat-shrinkable tape.

The chassis may include a bottom chassis supporting the plurality of circuit boards, and at least one portion of the cable may contact the bottom chassis based on the deformation member being shrunk.

According to another example aspect of the disclosure, a display apparatus includes: a display panel; a chassis accommodating the display panel; a plurality of circuit boards accommodated in the chassis; a flexible cable electrically connected to the plurality of circuit boards; and a deformation member comprising a thermally reactive material configured to deform the cable at a predetermined temperature or greater to cause a portion of the cable to contact the chassis.

The predetermined temperature may be set based on the display apparatus being driven.

The cable may be deformable to shorten a return path formed between the cable and the chassis based on the deformation member being shrunk.

The deformation member may be positioned on a surface of the cable opposite to one surface of the cable forming a return path based on the cable transmitting a signal.

The cable may include at least one of a flexible flat cable (FFC) or a flexible printed circuit board (FPCB).

The deformation member may be positioned on a center portion of the cable.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
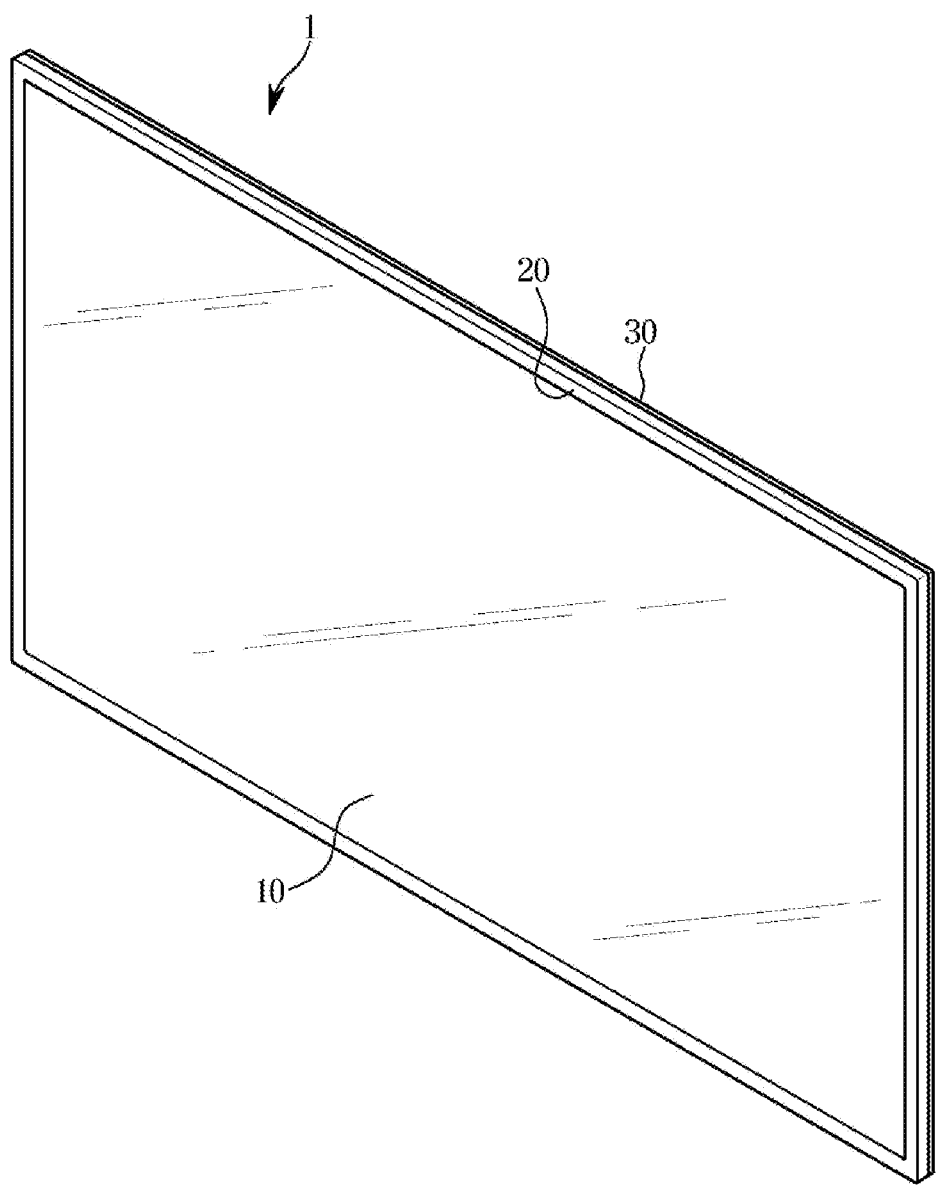
FIG. 1 is a diagram illustrating an example display apparatus according to an embodiment of the disclosure.

Like reference numerals may refer to like components throughout this disclosure. This disclosure may not describe all components of the various example embodiments, and general information in the technical field to which the disclosure belongs or overlapping information between the embodiments may not be described in detail.

Throughout this disclosure, it will be understood that when a certain part is referred to as being "connected" to another part, it can be directly or indirectly connected to the other part. When a part is indirectly connected to another part, it may be connected to the other part through, for example, and without limitation, a wireless communication network.

It will be understood that when a certain part "includes" a certain component, the part does not exclude another component but can further include another component, unless the context clearly dictates otherwise.

In the disclosure, it will also be understood that when an element is referred to as being "on" or "over" another element, it can be directly on the other element or intervening elements may also be present.

It will be understood that, although the terms first, second, etc. may be used herein to describe various components, these components should not be limited by these terms. These terms are simply used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Hereinafter, the example embodiments of the disclosure will be described in greater detail with reference to the accompanying drawings.

Figure 2:
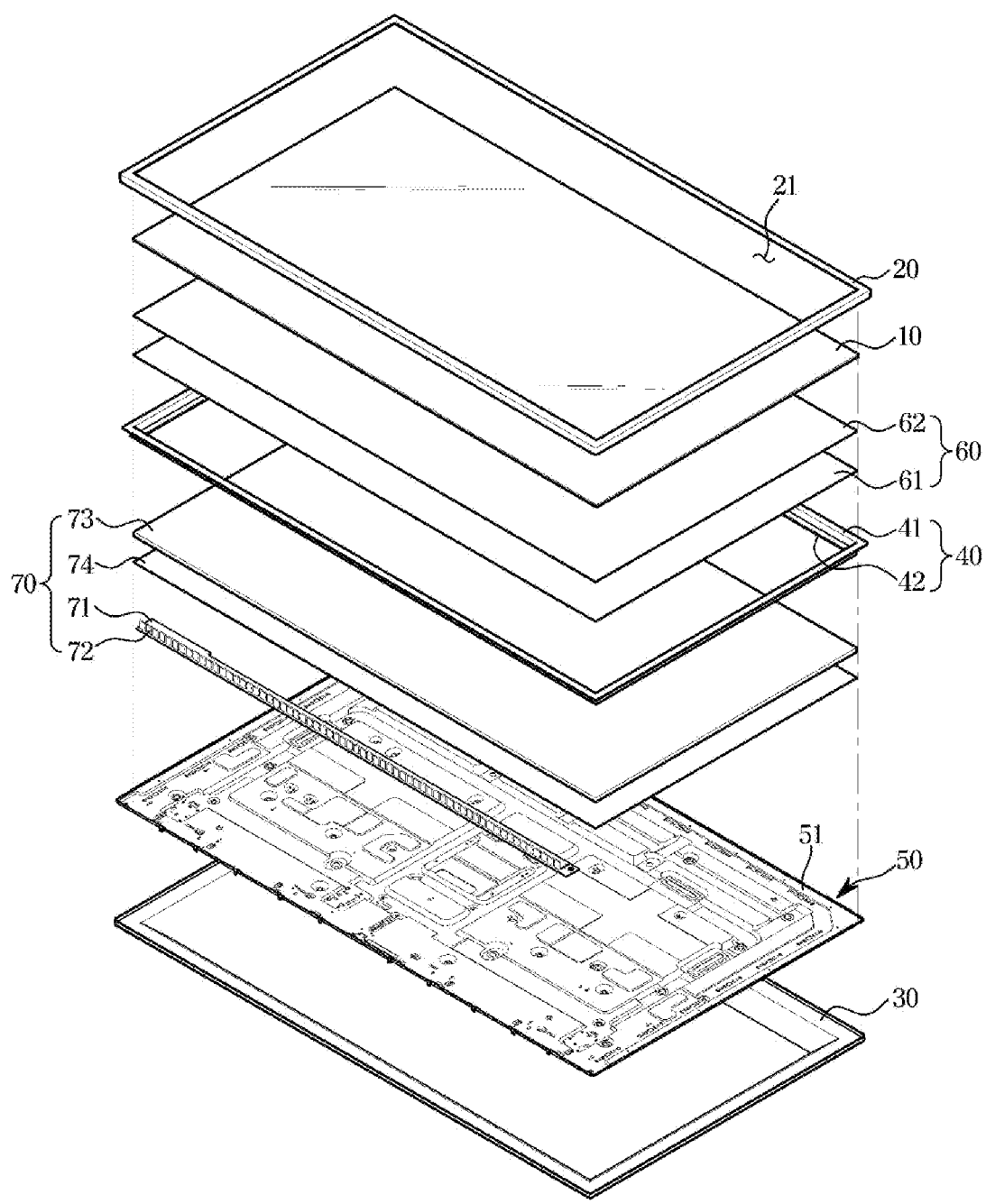
FIG. 2 is an exploded perspective view illustrating the example display apparatus shown in FIG. 1 according to an embodiment of the disclosure.

FIG. 1 is a diagram illustrating an example display apparatus according to an embodiment of the disclosure. FIG. 2 is an exploded perspective view illustrating the example display apparatus shown in FIG. 1 according to an embodiment of the disclosure.

A display apparatus 1 may be a flat panel display apparatus having a flat display panel 10 for displaying images, as shown in FIG. 1. Although not shown in the drawings, the display apparatus 1 may be a curved display apparatus having a curved display panel, or a bendable display apparatus having a display panel that can change the screen between a flat state and a curved state or that can adjust the curvature of the curved screen.

Referring to FIGS. 1 and 2, the display panel 10 may, for example, be a liquid crystal display (LCD) panel. The LCD panel may display images using a liquid crystal that appears the optical property according to a change in voltage and temperature. The LCD panel may include a thin film transistor (TFT) substrate, a color filter substrate coupled to the TFT substrate in such a way to be opposite to the TFT substrate, and a liquid crystal injected between the TFT substrate and the color filter substrate. The TFT substrate may, for example, be a transparent substrate in which TFTs as switching devices are arranged in a matrix form, and the color filter substrate may be a transparent substrate in which RGB color pixels as color pixels expressing predetermined colors are formed, for example, by a thin film process.

The display apparatus 1 may include a backlight unit 70 for providing light to the display panel 10. The backlight unit 70 may be positioned below the display panel 10 to irradiate light toward the display panel 10.

The backlight unit 70 may, for example, be an edge type in which a light source 72 is positioned in at least one of four sides of the display panel 10. Although not shown in the drawings, the display apparatus 1 may include a direct-type backlight unit in which a light source is positioned immediately below a display panel.

The backlight unit 70 may, for example, include the light source 72, a light source printed circuit board (PCB) 71 on which the light source 72 is mounted, and various optical members 73, 74 positioned on a traveling path of light emitted from the light source 72.

The light source 72 may, for example, be a light emitting diode (LED). The LED may be provided in a package form in which a LED chip is mounted on a substrate and a resin is filled. The light source 72 may, for example, be a cold cathode fluorescent lamp (CCFL) or an external electrode fluorescent lamp (EEFL).

On the light source PCB 71, a plurality of light sources 72 may be mounted in a line along an edge of the display panel 10. On the light source PCB 71, a circuit pattern, etc. may be printed to transfer driving power and signals to the light source 72. The light source PCB 71 may be mounted on a bottom chassis 50.

The optical members may be positioned on a traveling path of light emitted from the light source 72 to guide a traveling direction of the light or improve optical characteristics. The optical members may include a light guide plate 73 for uniformly distributing light emitted from the light source 72 toward the display panel 10, and a reflector sheet 74 for reflecting light to prevent light loss.

The light guide plate 73 may comprise a poly methyl methacrylate acrylate (PMMA) material. On the light guide plate 73, a pattern for changing a path of light may be provided. In an edge-type backlight unit, the light source 72 may be positioned along a side surface of the light guide plate 73. Light incident to the side surface of the light guide plate 73 may be scattered by the pattern formed in a lower surface of the light guide plate 73 and then exit through an upper surface of the light guide plate 73.

The reflector sheet 74 may reflect light emitted from the light source 72 to prevent and/or reduce light loss in the lower surface of the light guide plate 73. The reflector sheet 74 may be manufactured in various forms, such as, for example, and without limitation, a sheet, a film, a plate, or the like. For example, the reflector sheet 74 may be formed by coating a base material with a high-reflective coating material. The base material may, for example, and without limitation, be SUS, BRASS, aluminum, PET, etc. and the high-reflective coating material may be silver, $TiO_2$, etc.

The reflector sheet 74 may rest on the light source PCB 71 and be supported on the light source PCB 71. The light guide plate 73 may rest on the reflector sheet 74. The side surface of the light guide plate 73 may be spaced a predetermined distance from the light source 72 in consideration of thermal expansion.

The optical members may further include a quantum dot unit (not shown) or a quantum dot sheet. The quantum dot unit or the quantum dot sheet may improve color reproducibility by changing a wavelength of light. The color reproducibility may refer, for example, to an index of similarity to natural colors, and may relate to an area expressed on color coordinates. The quantum dot unit or the quantum dot sheet may be positioned in a path of light between the light source 72 and the display panel 10.

The display apparatus 1 may include various kinds of optical sheets 60 for improving optical characteristics. The optical sheets 60 may be positioned above the light guide plate 73 to improve optical characteristics of light exiting the light guide plate 73.

The optical sheets 60 may, for example, and without limitation, include a diffuser sheet 61, a prism sheet 62, or the like. Because light guided through the light guide plate 73 may directly enters eyes, the pattern of the light guide plate 73 may be presented as it is to the eyes. Therefore, the diffuser sheet 61 may cancel or reduce the pattern of the light guide plate 73.

The prism sheet 62 may concentrate light whose brightness has deteriorated when passing the diffuser sheet 61 to improve brightness. The prism sheet 62 may include, for example, a dual brightness enhancement film (DBEF) sheet which may refer, for example, to a high brightness prism sheet, etc.

The optical sheets 60 may further include a protection sheet for protecting the optical sheets 60 against external impacts or foreign materials. The optical sheets 60 may be positioned between the light guide plate 73 and the display panel 10.

The display apparatus 1 may include a chassis for accommodating and supporting the display panel 10 and the backlight unit 70. The chassis may include a top chassis 20, a middle mold 40, and the bottom chassis 50.

The top chassis 20 may include an opening 21 for exposing the display panel 10 and/or enabling the display panel 10 to be viewable. The middle mold 40 may include a middle mold side portion 41, and a middle support 42 protruding toward the inside from the middle mold side portion 41 to support the display panel 10 and the optical members and maintain an interval.

The bottom chassis 50 may support the backlight unit 70. Various components of the display apparatus 1, such as the top chassis 20 and the middle mold 40, may be fixed to and supported on the bottom chassis 50.

On an upper surface 51 of the bottom chassis 50, the light source PCB 71 of the backlight unit 70 may be mounted. The bottom chassis 50 may function to dissipate heat generated from the light source 72 to the outside. Heat generated from the light source 72 may be transferred to the bottom chassis 50 via the light source PCB 71 and dissipated from the bottom chassis 50.

The bottom chassis 50 may include various materials having excellent thermal conductivity, such as, for example, and without limitation, aluminum, stainless steel, an ABS resin, or the like. The light source PCB 71 may, for example, include a metal PCB comprising an aluminum material having excellent thermal conductivity.

At least one of the top chassis 20, the middle mold 40 or the bottom chassis 50 may be omitted or integrated into one body. The display apparatus 1 may include a rear cover 30 surrounding the chassis to protect and accommodate the chassis. Although not shown in the drawings, the display apparatus 1 may further include a leg (not shown) for supporting the display apparatus 1 on an installation surface.

Figure 3:
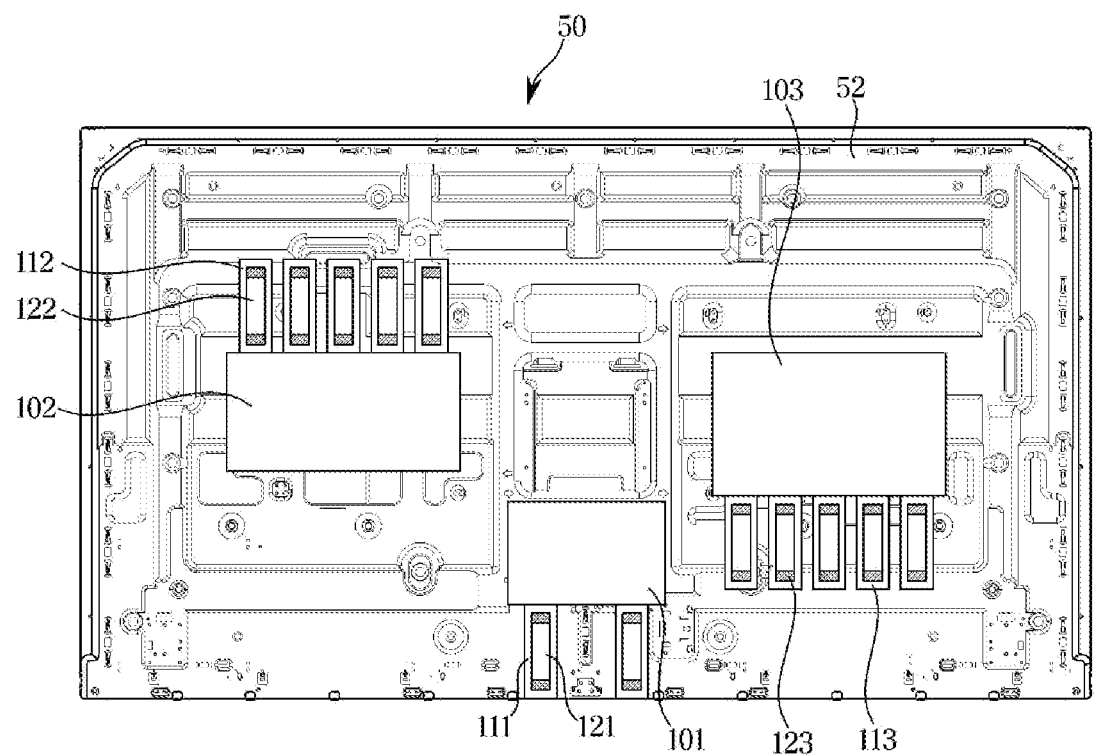
FIG. 3 is a diagram illustrating an example bottom of a bottom chassis shown in FIG. 2 according to an embodiment of the disclosure.
Figure 4:
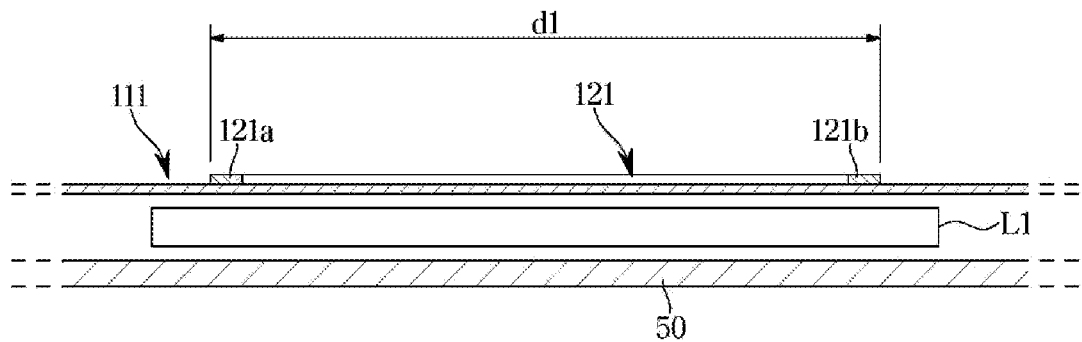
FIG. 4 is a diagram illustrating example states of a deformation member and a cable shown in FIG. 3 when the display apparatus shown in FIG. 1 is not driven according to an embodiment of the disclosure.
Figure 5:
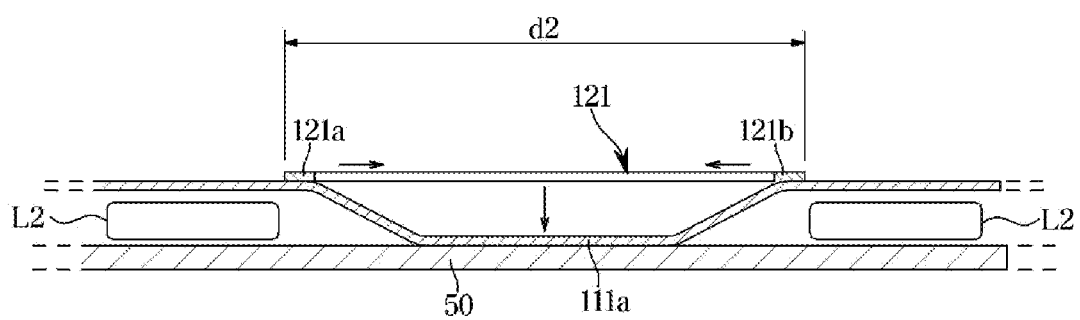
FIG. 5 is a diagram illustrating example states of the deformation member and the cable shown in FIG. 3 when the display apparatus shown in FIG. 1 is driven according to an embodiment of the disclosure.

FIG. 3 is a diagram illustrating a bottom of an example bottom chassis shown in FIG. 2 according to an embodiment of the disclosure. FIG. 4 is a diagram illustrating example states of a deformation member and a cable shown in FIG. 3 when the display apparatus shown in FIG. 1 is not driven according to an embodiment of the disclosure. FIG. 5 is a diagram illustrating example states of the deformation member and the cable shown in FIG. 3 when the display apparatus shown in FIG. 1 is driven according to an embodiment of the disclosure.

Referring to FIG. 3, the display apparatus 1 may include various circuit boards 101, 102 and 103. The various circuit boards 101, 102 and 103 may be accommodated in the chassis. For example, the various circuit boards 101, 102 and 103 may be positioned on a bottom 52 of the bottom chassis 50. The various circuit boards 102, 102 and 103 may include an integrated circuit (IC) (not shown) for transmitting/receiving data, signals or power in a wireless fashion to/from each other. The various circuit boards 101, 102 and 103 may include a first circuit board 101, a second circuit board 102 and a third circuit board 103.

The first circuit board 101 may, for example, and without limitation, include at least one of a main board, a switched mode power supply (SMPS) board or a source board. The first circuit board 101 may include a main board, a SMPS board or a source board. The first circuit board 101 may, for example, and without limitation, include a main board and a SMPS board, a main board and a source board, or a SMPS board and a source board. The first circuit board 101 may, for example, and without limitation, include all of a main board, a SMPS board and a source board.

The main board may, for example, include a processor for driving the display apparatus 1, and a power management device. The SMPS board may supply power for driving the display apparatus 1. The source board may control the display panel 10.

The main board, the SMPS board and the source board may be combined as described above, or may be positioned independently although not described above. The circuit boards positioned independently may be connected to each other to transmit/receive data, signals or power to/from each other, although not shown.

The second circuit board 102 and the third circuit board 103 may, for example, and without limitation, include a backlight unit (BLU) driver. The BLU driver may receive power to drive the backlight unit 70. To drive the backlight unit 70, the second circuit board 102 and the third circuit board 103 may be electrically connected to the display panel 10 and/or the backlight unit 70.

The display apparatus 1 may include a plurality of cables 111, 112 and 113 for electrically connecting the circuit boards 101, 102 and 103 to the display panel 10 and/or the backlight unit 70. The cables 111, 112 and 113 may be electrically connected to the plurality of circuit boards 101, 102 and 103. The cables 111, 112 and 113 may include a deformable material. The cables 111, 112 and 113 may include a flexible material. The cables 111, 112 and 113 may include, for example, and without limitation, flexible flat cables (FFCs) or flexible printed circuit boards (FPCBs).

The cables 111, 112 and 113 may include a first cable 111, a second cable 112 and a third cable 113.

One end of the first cable 111 may be electrically connected to the first circuit board 101, and the other end of the first cable 111 may be electrically connected to the display panel 10 or the backlight unit 70. One end of the second cable 112 may be electrically connected to the second circuit board 102, and the other end of the second cable 112 may be electrically connected to the display panel 10 or the backlight unit 70. One end of the third cable 113 may be electrically connected to the third circuit board 103, and the other end of the third cable 113 may be electrically connected to the display panel 10 or the backlight unit 70.

When the cables 111, 112 and 113 transmit signals, whether a return path is secured may have a great influence on EMI emission. For example, to operate all electronic circuits, a closed loop may need to be formed, and through the closed loop, a signal output from a source may be used in a load and then return to the source. A path of the returning signal may, for example, be referred to as a return path. The return path may be considered as a portion of the closed loop (see L1 or L2 in FIG. 5).

Emission energy through a signal transfer line may be proportional to an area of the closed loop L1 or L2 formed between the signal transfer line and the return path. For example, when a path through which current returns is large, capacitance may increase so that relatively large EMI emission occurs, whereas, when a path through which current returns is small, capacitance may decrease so that relatively small EMI emission occurs. Accordingly, to improve an EMI emission characteristic, a return path may need to be shortened.

To shorten a return path, the display apparatus 1 may include a plurality of deformation members 121, 122 and 123 respectively positioned on the cables 111, 112 and 113. The deformation members 121, 122 and 123 may be fixed to the cables 111, 112 and 113 at various portions. The deformation members 121, 122 and 123 may, for example, be fixed to the cables 111, 112 and 113 by an adhesive or an adhesive member. The deformation members 121, 122 and 123 may be positioned on portions of the cables 111, 112 and 113 to correspond to the closed loop L1 formed between the cables 111, 112 and 113 and the bottom chassis 50 when the cables 111, 112 and 113 transmit signals. For example, the deformation members 121, 122 and 123 may be positioned on portions of the cables 111, 112 and 113 to correspond to a return path formed between the cables 111, 112 and 113 and the bottom chassis 50 when the cables 111, 112 and 113 transmit signals. The deformation members 121, 122 and 123 may be positioned on the other surfaces of the cables 111, 112 and 113, which are opposite to one surfaces of the cables 111, 112 and 113 that may form a return path when the cables 111, 112 and 113 transmit signals. The deformation members 121, 122 and 123 may be positioned on the other surfaces of the cables 111, 112 and 113, which are opposite to one surfaces of the cables 111, 112 and 113 toward the bottom chassis 50. Accordingly, when the deformation members 121, 122 and 123 are shrunk, the cables 111, 112 and 113 may be bent toward the bottom chassis 50.

The deformation members 121, 122 and 123 may, for example, include a thermally reactive material. For example, the deformation members 121, 122 and 123 may include a heat-shrinkable material. The deformation members 121, 122 and 123 may include a material that is shrunk at a predetermined temperature or higher, wherein the predetermined temperature may be set based on when the display apparatus 1 is driven. For example, the deformation members 121, 122 and 123 may be shrunk by heat generated when the display apparatus 1 is driven. When the display apparatus 1 is driven, heat may be generated from at least one of the display panel 10, the backlight unit 70 or the chassis assembly. The deformation members 121, 122 and 123 may, for example, include heat-shrinkable tapes. A material having heat shrinkage is well known in the art, and therefore, a detailed description thereof may not be repeated here.

The deformation members 121, 122 and 123 may include a first deformation member 121, a second deformation member 122 and a third deformation member 123. The first deformation member 121 may be attached to the first cable 111. The second deformation member 122 may be attached to the second cable 112. The third deformation member 123 may be attached to the third cable 113.

The deformation members 121, 122 and 123 may be positioned on substantially center portions of the cables 111, 112 and 113. For example, the deformation members 121, 122 and 123 may be positioned on substantially center portions in longitudinal direction of the cables 111, 112 and 113, and on substantially center portions in width direction of the cables 111, 112 and 113. Accordingly, when the deformation members 121, 122 and 123 are shrunk, the cables 111, 112 and 113 may be deformed to contact some portions of the bottom chassis 50 and be grounded, thereby effectively reducing the return path.

When the display apparatus 1 is driven, heat may be generated from the display panel 10, the backlight unit 70, or the circuit boards 101, 102 and 103, and due to the heat, the deformation members 121, 122 and 123 may be shrunk. When the deformation members 121, 122 and 123 are shrunk, portions of the cables 111, 112 and 113 may be deformed to contact the bottom chassis 50. For example, the cables 111, 112 and 113 may be grounded to the bottom chassis 50, and accordingly, the return path may be relatively shortened.

Because the first cable 111, the second cable 112 and the third cable 113 have substantially the same configuration, for convenience of description, the first cable 111 is referred to as a cable 111, and the cable 111 will be described. Also, because the first deformation member 121, the second deformation member 122 and the third deformation member 123 have substantially the same configuration, for convenience of description, the first deformation member 121 is referred to as a deformation member 121, and the first deformation member 121 will be described.

Referring to FIG. 5, the deformation member 121 may include a first fixing portion 121a fixed to a portion of the cable 111, and a second fixing portion 121b fixed to the other portion of the cable 111. The first fixing portion 121a may be one end in longitudinal direction of the deformation member 121, and the second fixing portion 121b may be the other end of the deformation member 121, which is opposite to the one end in longitudinal direction of the deformation member 121. The second fixing portion 121b may be spaced from the first fixing portion 121a. The second fixing portion 121b may be spaced from the first fixing portion 121a along the longitudinal direction. The deformation member 121 may be fixed to the cable 111 through the first fixing portion 121a and the second fixing portion 121b that are spaced from each other. Accordingly, as shown in FIG. 5, when the deformation member 121 is shrunk, an interval between the first fixing portion 121a and the second fixing portion 121b may be reduced, so that a portion of the cable 111 may be deformed. For example, the deformation member 121 may have a first length d1 before being shrunk, as shown in FIG.

4, however, when the display apparatus 1 is driven so that heat is generated, the deformation member 121 may be shrunk to have a second length d2, as shown in FIG. 5. Due to such a contractile force, at least one portion between a portion to which the first fixing portion 121a is fixed and a portion to which the second fixing portion 121b is fixed may be bent to contact the bottom chassis 50.

The portion of the cable 111, which is deformed when the deformation member 121 is shrunk, may be referred to as a deformation portion 111a. The deformation portion 111a may indicate a portion of the cable 111 between the portion of the cable 111 to which the first fixing portion 121a is fixed and the other portion of the cable 111 to which the second fixing portion 121b is fixed. For example, the first fixing portion 121a of the deformation member 121 may be fixed to one end of the deformation portion 111a, and the second fixing portion 121b of the deformation member 121 may be fixed to the other end of the deformation portion 111a.

When the deformation member 121 is shrunk so that the first fixing portion 121a gets close to the second fixing portion 121b, at least one part of the deformation portion 111a of the cable 111 may be spaced from the deformation member 121 and bent toward the bottom chassis 50 of the chassis. Accordingly, a part of the deformation portion 111a may contact the bottom chassis 50 to be grounded. When the deformation member 121 is shrunk, the cable 111 may be deformed to shorten a return path of the closed loop L1 shown in FIG. 4, which may be formed between the cable 111 and the bottom chassis 50 of the chassis assembly, to a return path of the closed loop L2 shown in FIG. 5. For example, when the cable 111 is not deformed by the deformation member 121, the display apparatus 1 may have the closed loop L1 shown in FIG. 4, whereas, when the deformation member 121 is shrunk by driving heat of the display apparatus 1 so that the cable 111 is deformed, the display apparatus 1 may have the closed loop L2 shown in FIG. 5.

For example, referring to FIGS. 4 and 5, because an area of the closed loop L2 shown in FIG. 5 corresponding to a state in which portions of the cables 111, 112 and 113 contact the bottom chassis 50 is smaller than an area of the closed loop L1 shown in FIG. 4 corresponding to a state in which no portion of the cables 111, 112 and 113 contacts the bottom chassis 50, an amount of emission energy may also be small. Accordingly, in the display apparatus 1, a return path may have a relatively narrow area. For example, because portions of the cables 111, 112 and 113 are grounded to the bottom chassis 50 by the deformation members 121, 122 and 123 and function as a ground so that a short and narrow return path is formed, EMI emission may be reduced.

According to this configuration, in the display apparatus 1 according to an embodiment of the disclosure, because bending the cables 111, 112 and 113 in advance toward a direction of contacting the bottom chassis 50 in a manufacturing process is not needed, loading the cables 111, 112 and 113 may be easy. Also, because portions of the cables 111, 112 and 113 contact the bottom chassis 50 to shorten the return path by heat generated when the display apparatus 1 is driven after the display apparatus 1 is completely manufactured, without having to perform an operation of making portions of the cables 111, 112 and 113 contact the bottom chassis 50 using tapes during a manufacturing process, the manufacturing process may be simplified and an EMI characteristic may be effectively improved.

According to the disclosure, because a portion of the cable is grounded by the heat-shrinkable member included in the cable when the display apparatus is driven so that a return path is shortened due to the grounded portion of the cable, the display apparatus may improve the EMI characteristic.

Although various example embodiments of the disclosure have been illustrated and described, it will be understood by those of ordinary skill in the art that various changes in form and detail may be made without departing from spirit of the disclosure, the scope of which is included, for example, in the following claims and their equivalents.

What is claimed is:

1. A display apparatus comprising:
a display panel;
a chassis accommodating the display panel;
a plurality of circuit boards accommodated in the chassis;
at least one flexible cable electrically connected to each of the plurality of circuit boards and comprising a deformation portion; and
a deformation member comprising a thermally reactive material, a first fixing portion fixed to the flexible cable at a first position on a surface of the flexible cable adjacent to a first end of the deformation portion, and a second fixing portion fixed to the flexible cable at a second position on the surface of the flexible cable adjacent to a second end of the deformation portion opposite to the first end,
wherein the thermally reactive material in the deformation member is configured to position a portion of the deformation portion between the first position and the second position spaced apart from the chassis and against the deformation member at a temperature lower than a predetermined temperature,
wherein the thermally reactive material in the deformation member is configured to position the portion of the deformation portion between the first position and the second position spaced apart from the deformation member and contacting the chassis to provide a return path at a temperature higher than the predetermined temperature,
wherein the deformation member is positioned on the surface of the flexible cable opposite to another surface of the cable facing the chassis without contacting the chassis.

2. The display apparatus according to claim 1, wherein the thermally reactive material in the deformation member is configured to cause the deformation member to shrink between the first and second positions due to contractile force in the deformation member between the first and second positions at the temperature higher than the predetermined temperature.

3. The display apparatus according to claim 1, wherein the deformation member is shrinkable by heat generated based on the display apparatus being driven.

4. The display apparatus according to claim 1, wherein the deformation member is positioned on a center portion of the cable.

5. The display apparatus according to claim 1, wherein the deformation member contacts the flexible cable only at the first and second fixing portions at the temperature higher than the predetermined temperature.

6. The display apparatus according to claim 1, wherein the first fixing portion is closer to the second fixing portion at the temperature higher than the predetermined temperature than at the predetermined temperate.

7. The display apparatus according to claim 1, wherein the first fixing portion is spaced from the second fixing portion along a longitudinal direction of the cable.

8. The display apparatus according to claim 1, wherein the plurality of circuit boards include at least one of a main board, a backlight unit (BLU) driver, a switched mode power supply (SMPS) board or a source board.

9. The display apparatus according to claim 1, wherein, the cable is configured to be deformed toward a direction of shortening the return path between the cable and the chassis based on the deformation member being shrunk.

10. The display apparatus according to claim 1, wherein the surface of the cable is opposite to another surface of the cable providing the return path based on the cable transmitting a signal.

11. The display apparatus according to claim 1, wherein the cable includes at least one of a flexible flat cable (FFC) or a flexible printed circuit board (FPCB).

12. The display apparatus according to claim 1, wherein the deformation member includes a heat-shrinkable tape.

13. The display apparatus according to claim 1, wherein the chassis comprises a bottom chassis configured to support the plurality of circuit boards, and
at least one portion of the cable is configured to contact the bottom chassis based on the deformation member being shrunk.

14. A display apparatus comprising:
a display panel;
a chassis accommodating the display panel;
a plurality of circuit boards accommodated in the chassis;
a flexible cable electrically connected to each of the plurality of circuit boards; and
a deformation member comprising a material having thermal reactivity, fixed to a same surface the flexible cable via a first fixing portion and a second fixing portion disposed at opposite ends of the deformation member,
wherein the material having thermal reactivity is configured to position a portion of the flexible cable between the first and second fixing portions spaced apart from the chassis and against the deformation member at a temperature lower than a predetermined temperature,
wherein the material having thermal reactivity is configured to position the portion of the flexible cable between the first and second fixing portions spaced apart from the deformation member and contacting the chassis at the predetermined temperature or higher, and
wherein the deformation member is positioned on the surface of the flexible cable opposite to another surface of the cable facing the chassis without contacting the chassis.

15. The display apparatus according to claim 14, wherein the predetermined temperature is set based on the display apparatus being driven.

16. The display apparatus according to claim 14, wherein, the cable is configured to be deformable to shorten a return path provided between the cable and the chassis based on the deformation member being shrunk at the predetermined temperature or higher.

17. The display apparatus according to claim 14, wherein the deformation member is positioned on a surface of the cable, the surface being opposite to another surface of the cable providing a return path based on the cable transmitting a signal.

18. The display apparatus according to claim 14, wherein the cable includes at least one of a flexible flat cable (FFC) or a flexible printed circuit board (FPCB).

19. The display apparatus according to claim 14, wherein the deformation member is positioned on a center portion of the cable.

* * * * *